R. CARMICHAEL.
INTERNAL COMBUSTION ENGINE.
APPLICATION FILED MAR. 6, 1911.

1,016,981.

Patented Feb. 13, 1912.

6 SHEETS—SHEET 1.

WITNESSES:
J. H. Swan
A. F. Edgerton

INVENTOR.
Ray Carmichael.
BY
V. H. Lockwood
ATTORNEY.

R. CARMICHAEL.
INTERNAL COMBUSTION ENGINE.
APPLICATION FILED MAR. 6, 1911.

1,016,981.

Patented Feb. 13, 1912.

6 SHEETS—SHEET 3.

WITNESSES:
J. H. Swan
A. H. Edgerton

INVENTOR.
Ray Carmichael.

BY
V. H. Lockwood
ATTORNEY.

R. CARMICHAEL.
INTERNAL COMBUSTION ENGINE.
APPLICATION FILED MAR. 6, 1911.

1,016,981.

Patented Feb. 13, 1912.

6 SHEETS—SHEET 4.

WITNESSES:
J. H. Swan
A. H. Edgerton

INVENTOR.
Ray Carmichael.
BY
V. H. Lockwood
ATTORNEY.

R. CARMICHAEL.
INTERNAL COMBUSTION ENGINE.
APPLICATION FILED MAR. 6, 1911.
1,016,981.
Patented Feb. 13, 1912.
6 SHEETS—SHEET 5.
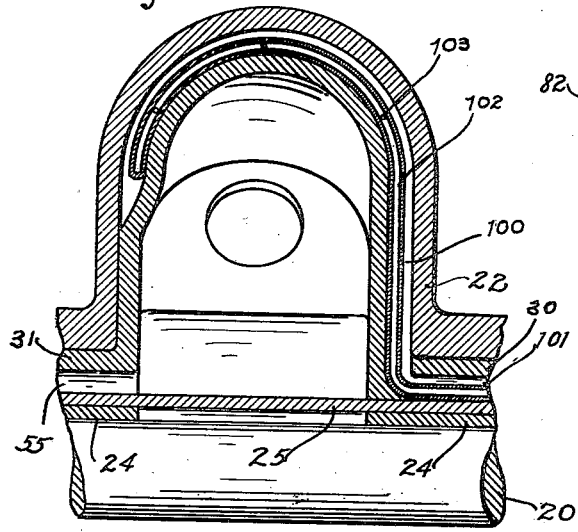
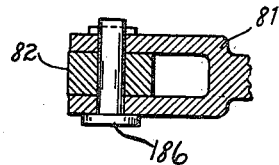
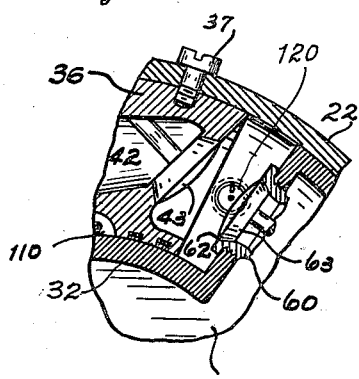
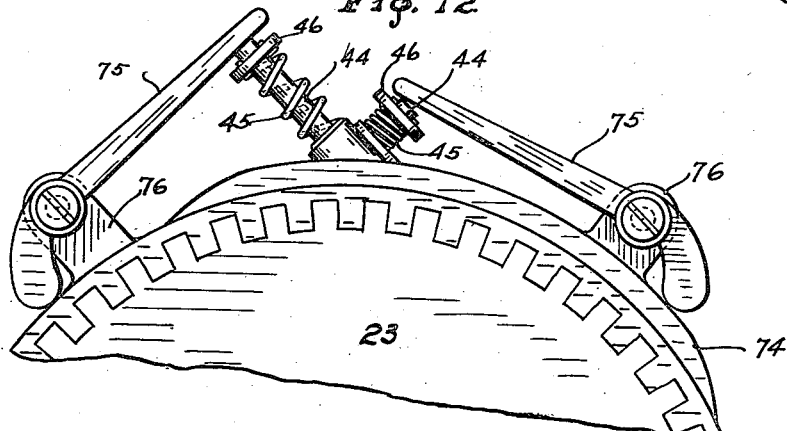
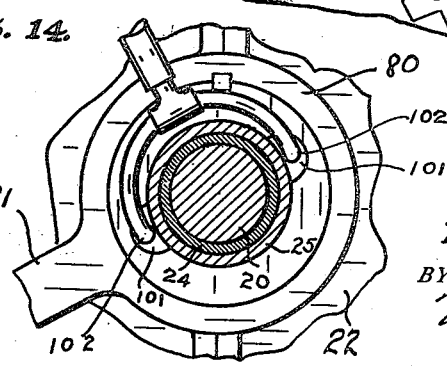
WITNESSES:
INVENTOR.
Ray Carmichael
BY
ATTORNEY

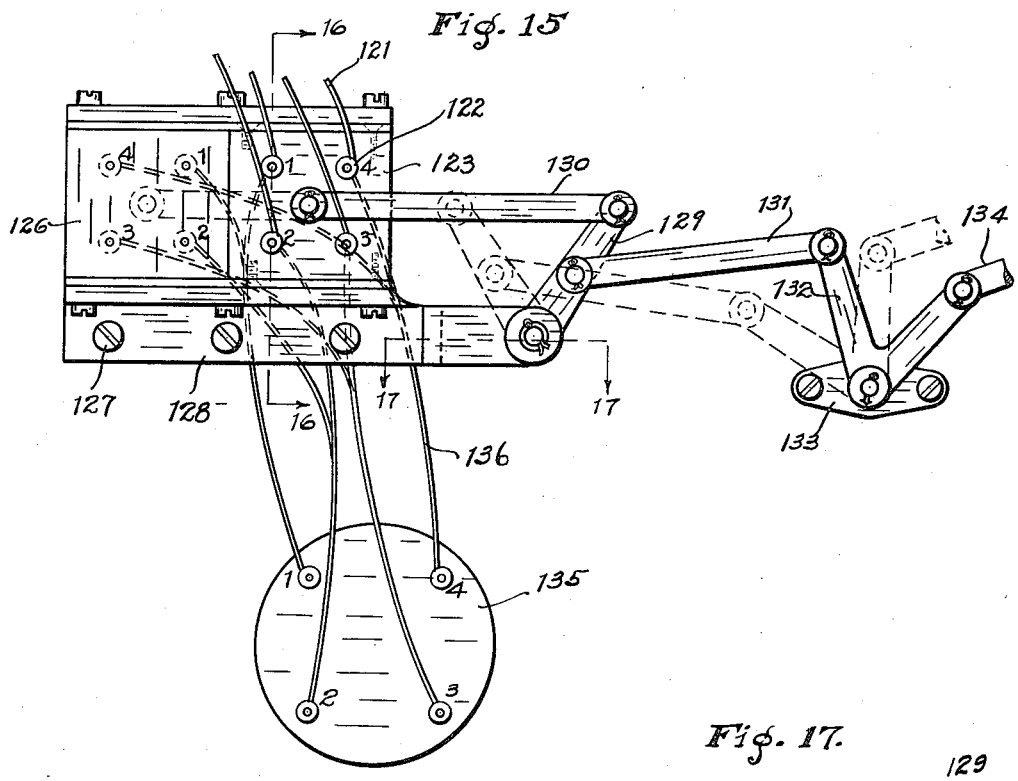

UNITED STATES PATENT OFFICE.

RAY CARMICHAEL, OF INDIANAPOLIS, INDIANA, ASSIGNOR TO INDIANAPOLIS GAS ENGINE COMPANY, OF INDIANAPOLIS, INDIANA, A CORPORATION.

INTERNAL-COMBUSTION ENGINE.

1,016,981.  Specification of Letters Patent.  Patented Feb. 13, 1912.

Application filed March 6, 1911. Serial No. 612,554.

*To all whom it may concern:*

Be it known that I, RAY CARMICHAEL, of Indianapolis, county of Marion, and State of Indiana, have invented a certain useful Internal-Combustion Engine; and I do hereby declare that the following is a full, clear, and exact description thereof, reference being had to the accompanying drawings.

The object of this invention is to improve the construction of reciprocatory four-cycle engines, wherein the piston is oscillatory, so as to render the engine readily reversible, non-vibrating, compact and light.

The nature of the improvement will be understood from the accompanying drawings and the following description and claims.

Figure 1:
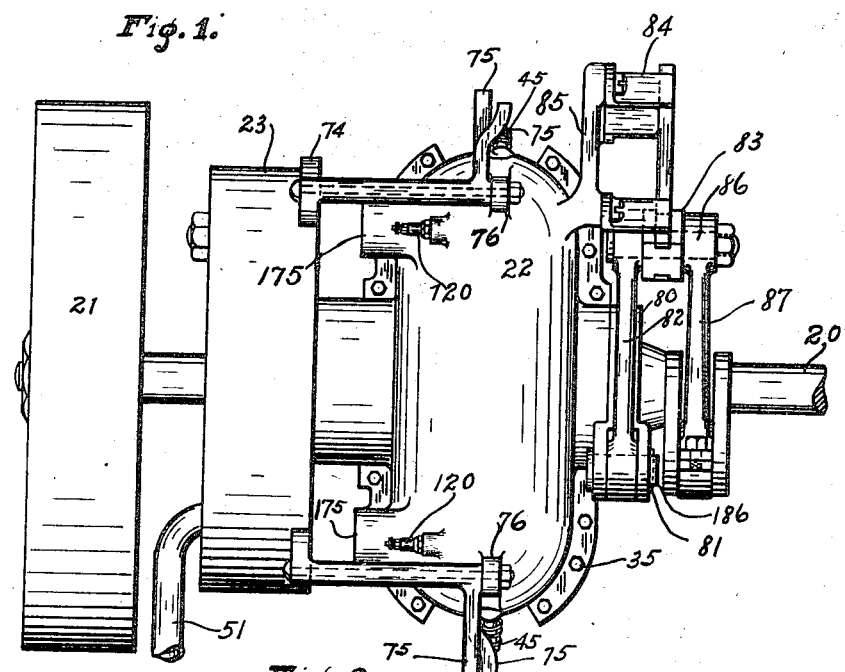
Figure 2:
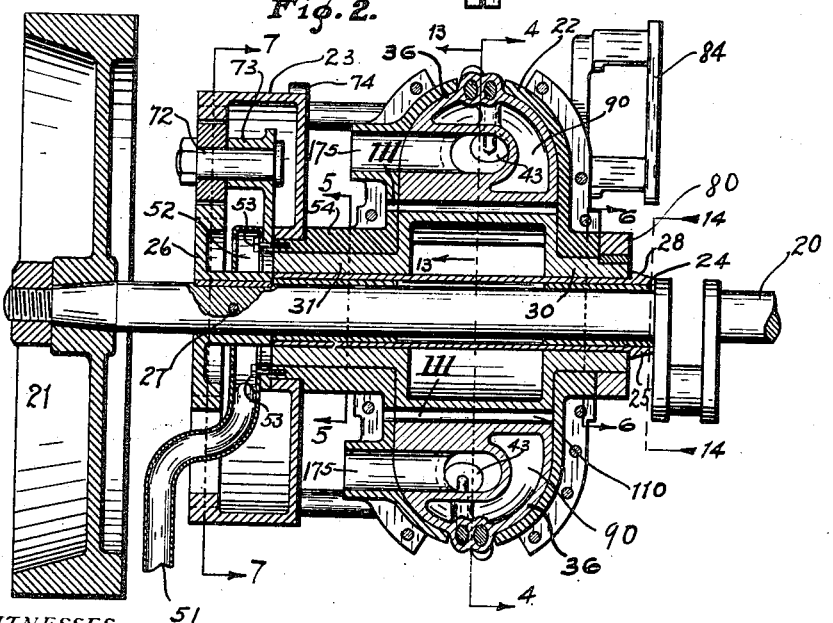
Figure 3:
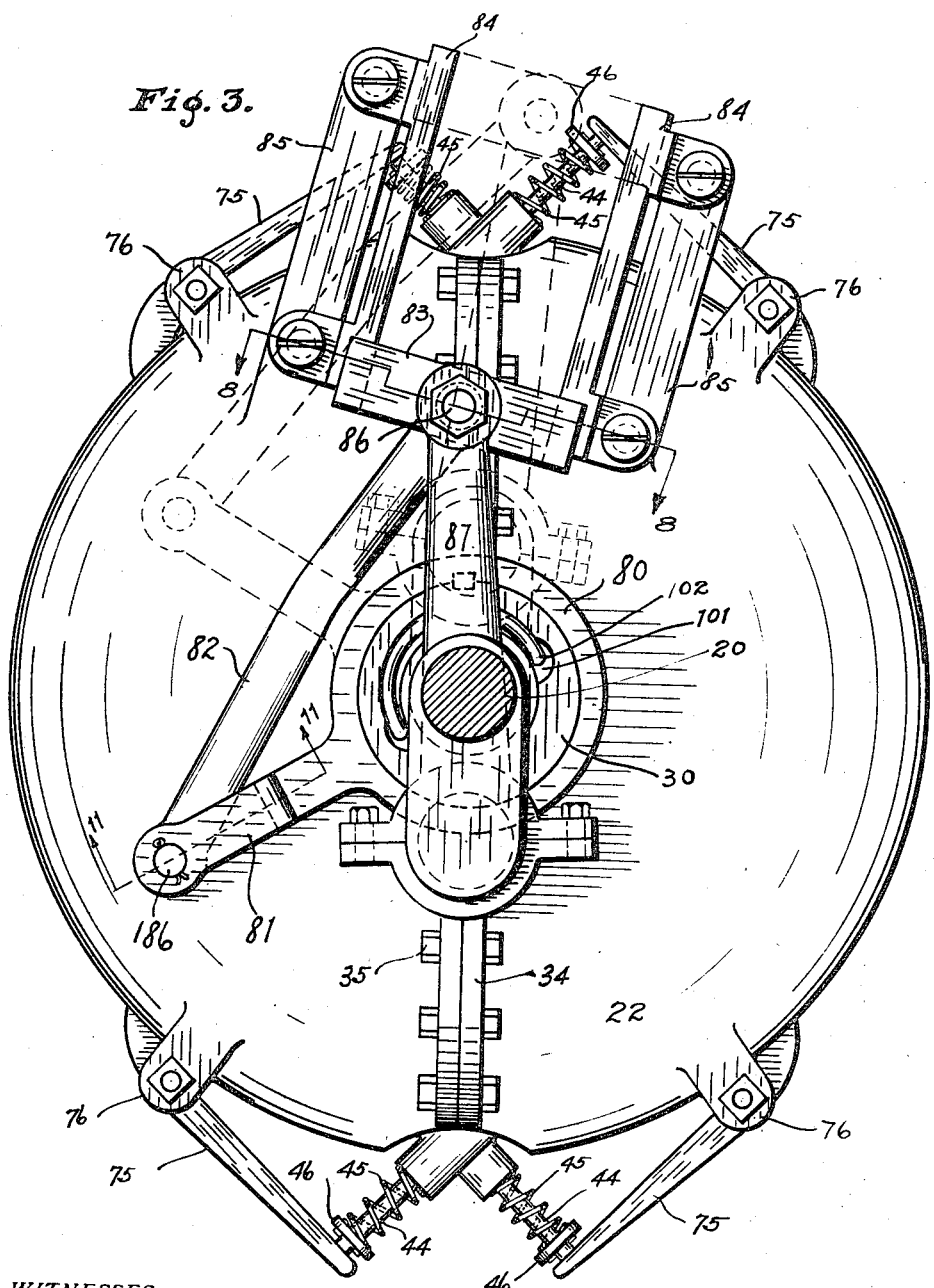
Figure 4:
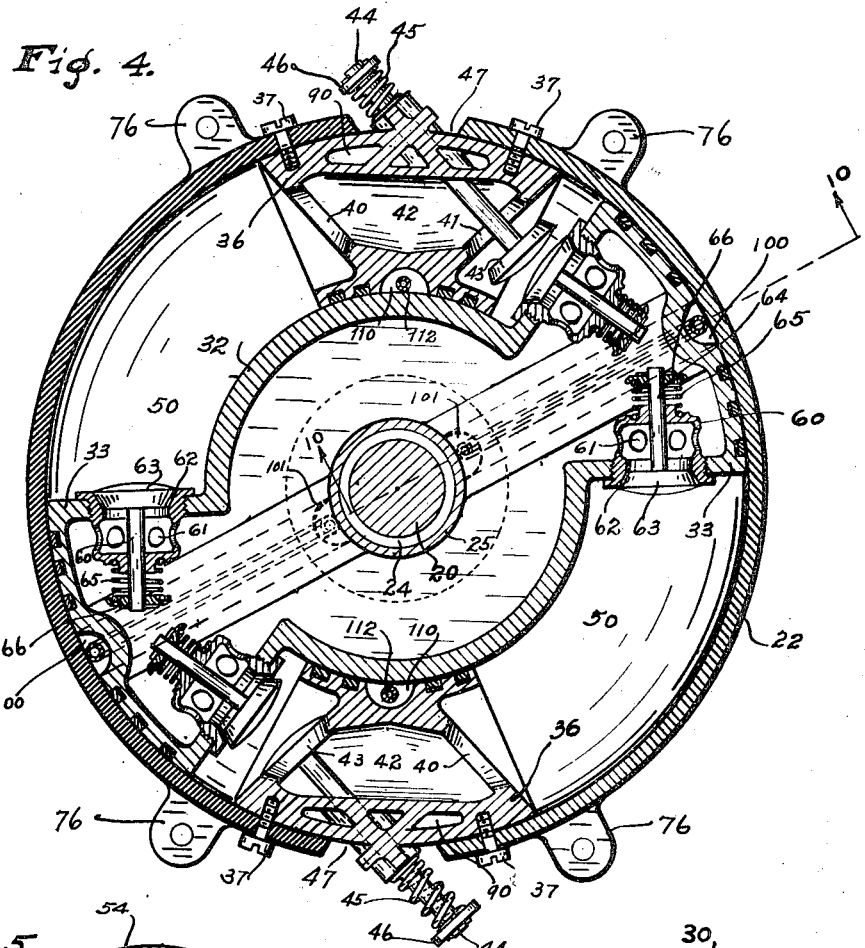
Figure 5:
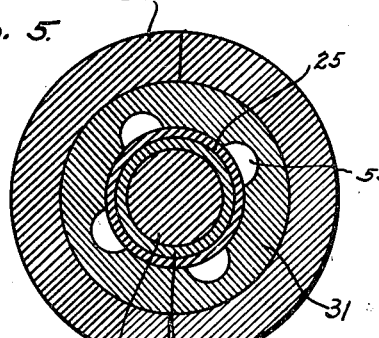
Figure 6:
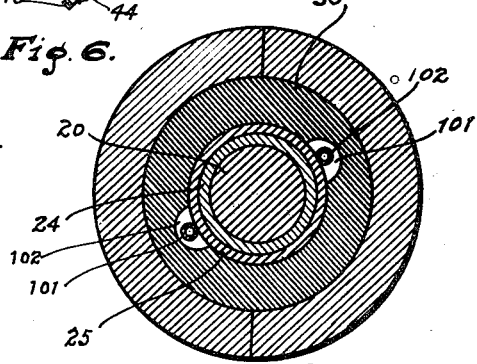
Figure 7:
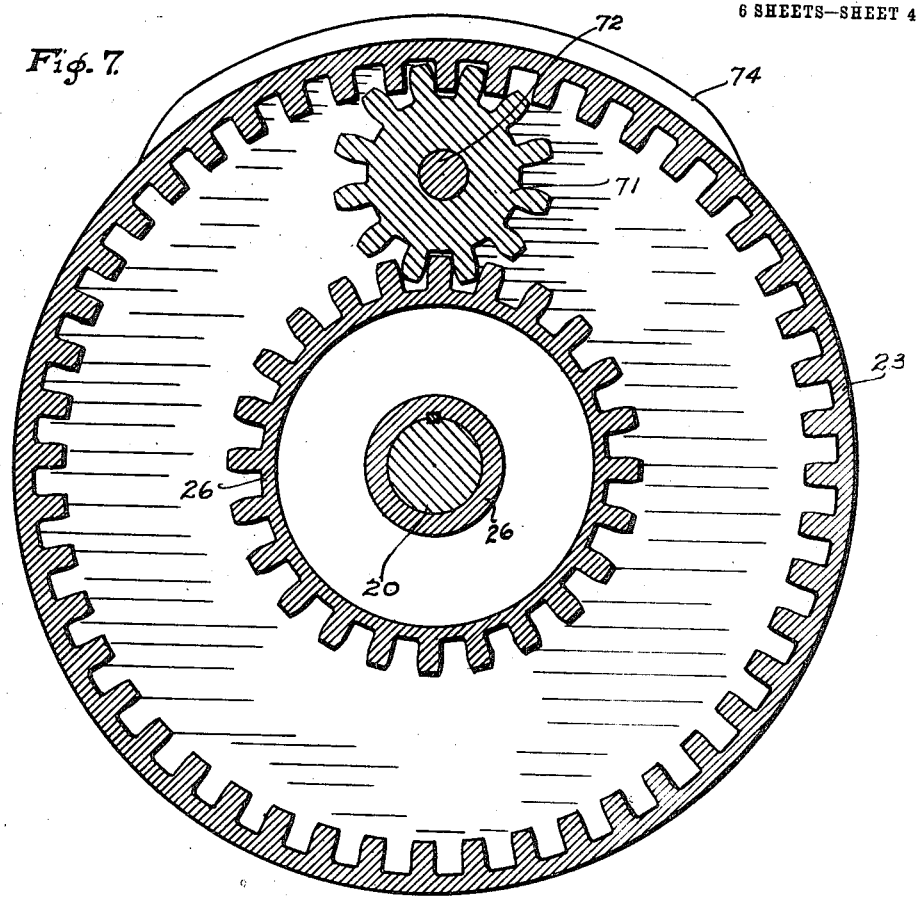
Figure 8:
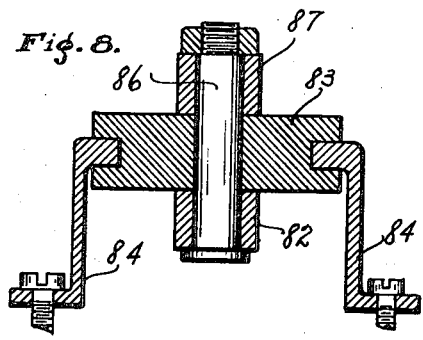
Figure 9:
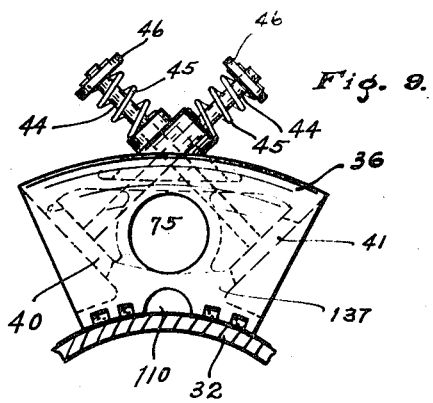

In the drawings Figure 1 is a front elevation of the engine with parts broken away. Fig. 2 is a central vertical longitudinal section through the same. Fig. 3 is an elevation of the right-hand end of the engine as it appears in Fig. 1. Fig. 4 is a transverse section on the line 4—4 of Fig. 2 showing the piston at one end of its movement. Fig. 5 is a section on the line 5—5 of Fig. 2. Fig. 6 is a section on the line 6—6 of Fig. 2. Fig. 7 is a section on the line 7—7 of Fig. 2. Fig. 8 is a section on the line 8—8 of Fig. 3. Fig. 9 is a side elevation of one of the division blocks and the valves associated therewith. Fig. 10 is a section on the line 10—10 of Fig. 4 to and including the crank shaft, parts being broken away and with the valve removed. Fig. 11 is a section on the line 11—11 of Fig. 3. Fig. 12 is a side elevation of a section of the internal gear disk for regulating the operation of the valves and associated trip rods and valve stems. Fig. 13 is a section of a portion of the device on the line 13—13 of Fig. 2. Fig. 14 is a section on the line 14—14 of Fig. 2. Fig. 15 is an elevation of the reversing mechanism, parts being broken away. Fig. 16 is a section on the line 16—16 of Fig. 15. Fig. 17 is a section on the line 17—17 of Fig. 15.

In detail, the drawings herein show, for the purposes of explaining the general nature of my invention, a crank shaft carrying on one end a fly-wheel 21 mounted in the center of the engine, that is, in the center of the cylinder 22 and the valve controlling gear 23, as appears in Fig. 2. The crank shaft is mounted in a bearing 24 and that in a steel sleeve 25 which is secured on the crank shaft and lies between the crank at one end and the hub of the gear 26, which is secured on the shaft by a pin 27, see Figs. 2 and 7. The sleeve 25 has a shoulder 28 on one end, and on said sleeve there is mounted the hubs 30 and 31 of the piston. The piston consists of said two hubs and a cylindrical enlargement 32, from opposite sides of which fan-shaped projections 33 extend, as shown in Fig. 4. The peripheral surfaces of the fan-shaped extensions 33 of the piston are curved so as to fit snugly within the internal periphery of the internal cylinder 22 and carry suitable packing to prevent the passage of air or gas from one side of the piston to the other.

The cylinder 22 is made up of two halves, as indicated in Figs. 2, 3 and 4, each half having a flange 34 said flanges being bolted together by the bolts 35, as shown in Fig. 3. Within said cylinder, as shown in Fig. 2, the division blocks 36 are secured by screws 37. They extend in from the periphery of the cylinder to the central enlargement 32 of the piston and said blocks are provided with suitable packing in engagement with the cylinder. These two blocks are provided with two exhaust ports 40 and 41 connected by the chamber 42, and each port is closed or controlled by a valve 43 on a stem 44 which extends through the block and beyond the same and is normally closed by the spring 45 which surrounds the stem 44 and lies between the portion of the block 36 and the washer 46. The cylinder is cut away somewhat at 47, as shown in Fig. 4, for the extension of a portion of the block 36 for mounting the valve stems 44. This provides two large piston chambers 50 in the cylinder, one on each side of the division blocks 36, and the ends 33 of the piston project into these two chambers and oscillate in said chambers so that when said piston is in place in the cylinder, there are practically four chambers, one portion of each chamber 50 lying on each side of the extension 33 of the piston.

The gas enters the chambers to the cylinder through the piston and for that purpose said piston is hollow. The gas enters from the carbureter through the pipe 51 into a chamber 52 which surrounds the hub of the wheel 26, as shown in Fig. 2, and is secured by screws 53 to a circular flange 54 extending from the cylinder 22. The gas passes from the chamber 52 into the hollow piston through passageways 55, see Fig. 5, formed longitudinally in the inner surface of the hub 31 of the piston. There is no valve in the engine or between the engine and the throttle valve of the carbureter for interrupting the flow of the gas into the piston.

From the piston the gas passes into the chambers 50 of the cylinder through cages 60, there being one cage on each side of each extension 33 and said cages being hollow and having an inlet port 61 and an outlet port 62 which is controlled by a valve 63 on a stem 64 extending through and having bearing in the cage and closed by a spring 65 lying between the inner end of the cage and a washer 66 on the end of the valve stem. These valves are automatically opened by the vacuum in the cylinder chamber. The action of said valves 63 and also of the gas in the cylinder is regulated by the exhaust valves 43, and they are regulated by means, which will be hereafter explained, so that it is a four-cycle engine and substantially the same in operation and effect as a four-cylinder engine. When one end of the chamber 50 is exhausted, the other end is taking in gas, while the opposite chamber 50 is at the same time exploding at one end and compressing at the other.

The means for controlling the exhaust valves and regulating the action of the engine automatically is as follows: The gear 26, which has heretofore been described, and which is secured on the crank shaft, lies within the large internal gear 23, and between them an intermediate pinion 71 is located, as appears in Fig. 7. The pinion 71 is mounted on a stationary spindle 72, see Fig. 2, which is secured in an arm or bracket 73 which is bolted by the bolts 53 to the flange 54 of the casing, and, therefore, the bracket 73 is stationary within the internal gear 23 which revolves in opposite direction to the gear 26. The internal gear 23 has bearing on the reduced portion of the end of the flange 54 of the cylinder 22, as seen in Fig. 2. The gears 23, 26 and 71 are of such sizes relatively to each other as to cause the gear 26 to make two revolutions to one revolution of the gear 23. The internal gear 23 has a cam-like elongated projection 74, see Figs. 7 and 12, on its periphery so that at each revolution of said gear it will actuate the valve trips 75 which have bearing between their ends in ears 76 from the casing 22. The extension on the internal gear actuates one end of the valve trip, and the other end bears against and forces in the valve stem 44, see Fig. 12, against the action of the spring 45, and thus opens the exhaust valve 43. It makes no difference in which direction the gears 26 and 23 move. Since there are two exhaust valves mounted in each division block 36, as shown in Fig. 4, there will be four of said valves and valve stems, and consequently there will be four of the trips 75, two on each side of the cylinder, but the arrangement is such that the actuated ends of the trip 75 will be located exactly ninety degrees apart in series, and the cam-like extension 74 is also substantially ninety degrees and will, therefore, operate one trip and open one valve and hold it open until it reaches the next trip and so on in series, so that at all times there will be one exhaust valve open and only one.

The parts which have been described including the gears 23 and 26 are so mounted and arranged in connection with the crank shaft and the piston on the crank shaft as to cause said exhaust valves to open at the right time with relation to the movements of the piston. The exhaust passes through the ports 40 and 41 and chamber 42 in the division block and out through the exhaust ports 175 of the cylinder, as shown in Fig. 1.

The mechanism for transmitting power from the piston to the crank shaft is as follows: On the hub 30 of the piston, see Fig. 2, a ring 80 of the rocker arm 81 is secured, and the outer end of said rocker arm 81 is bifurcated, as shown in Fig. 11, and pivotally connected to a connecting bar 82, which is pivoted between the bifurcated ends of the rocker arm. A connecting rod 82 extends from the outer end of the rocker arm to the crosshead 83 which reciprocates between the two guides 84, which are secured to the bracket 85, extending from the cylinder 22, as shown in Fig. 1. Said crosshead carries a pin 86 for connecting the connecting rod 82 to the crosshead, and on the opposite side of the crosshead there is pivoted a connecting rod 87 which runs to the crank of the crank shaft. The engine is air-cooled and for that purpose the blocks 36 are provided with chambers 90, see Figs. 2 and 4. The principal cooling, however, is effected by the intake, the gas going through the passageways 55 near the bearing between the piston and sleeve 25 and also within the piston. Thus the whole interior of the piston, as shown in Fig. 4, would be cooled by the incoming gas. However, the incoming gas as it enters the piston will be warmed or heated to some extent by the heat of the piston resulting from the explosions in the engine, and thus renders the gas more explosive.

If any gas leaks between the cylinder and the surfaces of the piston and packing, it will be disposed of or carried away through the passageway 100 which is formed in the outer surface of the piston, as shown in Figs. 4 and 10, and pass out through the passageway 101 between the hub 30 of the piston and the sleeve 25, as shown in Fig. 6, to the outer air. Within these passageways 100 and 101 there is also placed a lubricating tube 102 with small holes 103 arranged at intervals. The tube 100 is flexible. The construction shown in Fig. 10 is similar on the opposite sides of the shaft, so that there will be two outlet ends of the tube 102, as shown in Fig. 6, and they are connected with a divided tube 104, which is in communication with a flexible tube 105 leading from any suitable source of supply. The flexibility of the tube 105 permits the arrangement just described, in view of the oscillation of the piston, and, therefore, the outer end of the tubes 102. The extent of oscillation is substantially 45 degrees. Thus the surfaces of the piston and cylinder, which engage each other during the oscillation of the piston, are kept constantly lubricated. There is also a passageway or chamber 110 which extends across each of the division blocks 36, as shown in Figs. 2 and 4, and they lead out to the open air through the port 111 in one wall of the cylinder. As shown in Fig. 4, lubricating tubes 112 are also located in said passageway 110 corresponding to the arrangement of the tubes 102 in passageways 100 heretofore explained. The cylinder is provided with four spark plugs 120, see Figs. 1 and 13.

The engine is reversed by the means shown in Figs. 15, 16 and 17, which is adapted for this type of engine only. The plan is to provide two sets of terminals in electrical communication with the timer, said two sets of terminals being reversely arranged with relation to each other and providing sliding means having terminals connected with the spark plugs for moving said sliding terminals first into engagement with either group of timer terminals, so that the engine can be caused to run in either direction, as desired, or be readily reversed. The wires 121 run to the terminals 122 on the sliding plate 123. These terminals are numbered in the order indicated in Fig. 15 and corresponding with the spark plugs. The plate 123 is made of insulating material within a frame 124, which slides in a fixed frame 125, and in that fixed frame there is a plate 126 of insulating material at least twice as long as the plate 123. The frame 125 is secured in place by the screws 127 which extend through the bar 128 of said frame, and that bar at one end is extended and has pivotally mounted on it the arm 129. The outer end of that arm is pivoted to a connecting rod 130 which extends to the plate 123. A connecting rod 131 extends from the arm 129 intermediate its ends to one end of the bell-crank lever 132. This bell-crank lever is pivoted between its ends to a fixed plate 133, and a bar 134 extends from the other end of said bell-crank lever to any suitable means for rocking said bell-crank lever and thus causing the plate 123 to be moved from the position shown in Fig. 15 to the left of the left-hand portion of plate 126.

135 represents the distributer of the timing apparatus of any desired type, and wires 136 extend from this timing distributer to the terminals 237. There are two sets of these terminals 237, one set being at the right-hand half of the plate 126, and the other set being in the left-hand half. The wires 136 are divided so that one branch thereof goes to one set of the terminals 237, and the other branch to the other set of such terminals. Thus one branch of one wire 136 goes to the fourth terminal in each set of terminals 237, another wire 136 has both branches going to the second terminal of each set, etc. The terminals 237 in the two sets, however, are arranged reversely with relation to each other and with relation to the terminals 122. Thus in one set of terminals 237 the terminal No. 1 registers with terminal No. 1 on plate 123, and likewise throughout the pairs. But when the plate 123 is moved over to the left-hand end, terminal No. 1 in plate 123 will contact with terminal No. 4 at the left-hand end while terminal No. 4 in plate 123 will contact with terminal No. 1 in said plate 123. And thus the order of ignition in the engine will be just the reverse of what it was before. For this purpose the terminals 122 and 237 extend through the various blocks 123 and 126 into contact with each other, as shown in Fig. 16. The guideway formed of the guides 84 is arranged obliquely, as shown in Fig. 3, so that the center line thereof would extend between the shafts and the outer end of the rocker arm. This construction is provided in order to prevent the crank 87 from ever centering.

I claim as my invention:

1. An internal combustion engine provided with a fan-shaped combustion chamber, an oscillatory hollow piston operating therein, ignition means in said chamber, means for conveying the combustible mixture into said piston, and valve-controlled ports in said piston for charging the combustion chamber.

2. An internal combustion engine provided with a fan-shaped combustion chamber, an oscillatory hollow piston operating in said chamber, ignition means in said chamber at each side of said piston, means for conveying the combustible mixture into said piston, and valve-controlled ports at each side of said piston for charging the combustion chamber.

3. An internal combustion engine including a pair of oppositely located combustion chambers, an oscillatable hollow piston with its axis between said chambers and its ends projecting into and operating in said chambers, ignition means at each end of each of said chambers, means for conveying explosive mixture into said hollow piston, and a valve-controlled port at each side of each end of said piston for charging the combustion chambers.

4. An internal combustion engine including a pair of oppositely located combustion chambers, an oscillatable hollow piston with its axis between said chambers and its ends projecting into and operating in said chambers there being a longitudinal passageway near the axis of said piston to the interior of the piston, a stationary chamber adjacent said piston near its axis and in communication with said passageway whereby explosive mixture may be furnished to said piston during its operation, ignition means at each end of each of said chambers, and a valve-controlled port at each side of each end of said piston for charging the combustion chambers.

5. An internal combustion engine including a pair of oppositely located combustion chambers, an oscillatable hollow piston with its axis between said chambers and its ends projecting into and operating in said chambers and having a laterally extending hub on one end, means on which said piston is mounted the hub of the piston being provided with a longitudinal passageway, and a non-rotative chamber at the end of the piston hub having communication with said passageway whereby combustible mixture may be supplied to the interior of the piston, ignition means at each end of each of said chambers, and a valve-controlled port at each side of each end of said piston for charging the combustion chambers.

6. An internal combustion engine including a pair of oppositely located combustion chambers, a shaft extending between said chambers, bearing sleeves on said shaft, a tube mounted on said bearing sleeves, an oscillatory piston provided with hubs mounted on said tube and having longitudinal passageways in one hub adjacent said tube with the ends of said piston projecting into said chambers, a stationary chamber adjacent the end of said piston hub and in communication with said passageways therethrough for supplying explosive material to the interior of said piston, ignition means at each end of each of said chambers, and a valve-controlled port at each side of each end of said piston for charging the combustion chambers.

7. An internal combustion engine including a cylinder, division members located within said cylinder at diametrically opposite points and provided with exhaust ports in each side of said division members, a hollow piston formed of a central circular portion with its axis concentric with said cylinder and said division members and engaging said division members and having two opposite extensions engaging the internal periphery of said cylinder, whereby there will be formed two oppositely located chambers in which said opposite piston extensions may oscillate, means for supplying explosive mixture to the interior of the piston, valve controlled ports from each side of each end of the piston for charging the cylinder chambers, and spring-controlled valves for the exhaust ports in said division members.

8. An internal combustion engine including a cylinder, division members located within said cylinder at diametrically opposite points and provided with exhaust ports in each side of said division members in communication with an exhaust passageway through each division member and the wall of the cylinder and each division member provided with a chamber at each end outside of the exhaust port, a spring-controlled valve mounted in the division members for each exhaust port, a hollow piston formed of a central circular portion with its axis concentric with said cylinder and said division members and engaging said division members and having two opposite extensions engaging the internal periphery of said cylinder, whereby there will be formed two oppositely located chambers in which said opposite piston extensions may oscillate, means for supplying explosive mixture to the interior of the piston, valve-controlled ports from each side of each end of the piston for charging the cylinder chambers, and spring-controlled valves for the exhaust ports in said division members.

9. An internal combustion engine including a cylinder, division members secured in said cylinder at diametrically opposite points and provided with an exhaust port through each end and chambered for the admission of air or water to cool the same, a hollow piston formed of a central circular portion with its axis coaxial with said cylinder and said division members and engaging said division members and having two opposite extensions engaging the internal periphery of said cylinder, whereby there will be formed two oppositely located chambers in which said opposite piston extensions may oscillate, means for supplying explosive mixture to the interior of the piston, valve-controlled ports from each side of each end of the piston for charging the cylinder chambers, and spring-controlled valves for the exhaust ports in said division members.

10. An internal combustion engine provided with a pair of oppositely disposed fan-shaped combustion chambers, an oscillatory piston with its axis between said combustion chambers and with extensions projecting into and operating in said chambers and having a hub, means for supplying an explosive mixture to the combustion chambers for causing the oscillation of the piston, a rocker arm secured to the hub of the piston, a crank shaft coaxial with said piston, a connecting rod from the crank of the crank shaft, a crosshead pivoted to the outer end of said connecting rod, a fixed guide for said crosshead, and a connecting rod between the outer end of said rocker arm and said crosshead, whereby the rocker arm will operate the crosshead and cause the rotation of the shaft.

11. An internal combustion engine provided with a pair of oppositely disposed fan-shaped combustion chambers, an oscillatory piston with its axis between said combustion chambers and with extensions projecting into and operating in said chambers and having a hub, means for supplying an explosive mixture to the combustion chambers for causing the oscillation of the piston, a rocker arm secured to the hub of the piston, a crank shaft extending axially through the cylinder and piston with the crank external, a connecting rod on said crank, a crosshead pivoted to the outer end of the connecting rod, a guide for the crosshead secured to the cylinder, and a connecting rod pivoted to the cylinder and the outer end of the rocker arm, substantially as set forth.

12. An internal combustion engine including a cylinder, an oscillatory piston operating within said cylinder having an axis concentric with the cylinder and radially extending portions engaging the periphery of the cylinder, means for dividing the cylinder into two oppositely located combustion chambers and said means having suitable exhaust ports, exhaust valves for said ports having outwardly projecting stems, springs for closing said valves, a shaft concentric with said piston, means driven by the piston for rotating the shaft, a wheel outside of the cylinder which is rotated by the shaft and which has a projecting cam-like extension on its periphery, and means mounted on the outer periphery of the cylinder which are periodically actuated by said extension from said wheel, whereby said exhaust valves will be periodically opened.

13. An internal combustion engine including a cylinder, an oscillatory piston operating within said cylinder having an axis concentric with the cylinder and radially extending portions engaging the periphery of the cylinder, means for dividing the cylinder into two oppositely located combustion chambers and said means having suitable exhaust ports, exhaust valves for said ports having outwardly projecting stems, springs for closing said valves, a shaft concentric with said piston, a gear secured on said shaft, an internal gear wheel revolubly mounted in connection with said cylinder said internal gear having a cam-like extension on its outer periphery, a pinion between the gear on the shaft and said internal gear for driving the latter, and means mounted at suitable intervals on the external periphery of the cylinder adapted to be periodically actuated by the extension on the external gear for opening the exhaust valves.

14. An internal combustion engine including a cylinder with four radially extending ears, division members secured within said ears and each provided with a pair of exhaust ports, a pair of exhaust valves in each division member with the stems thereof extending outwardly, a spring for closing said exhaust valves, an oscillatory piston within said cylinder and concentric with said cylinder, means for oscillating said piston, a shaft concentric with said shaft, a gear secured on said piston outside the cylinder, a large internal gear rotatably mounted on an extension from said cylinder concentric with said shaft and having a cam-like extension on its periphery, a frame secured to the extension from said cylinder and located within said internal gear, a pinion mounted on said frame so as to engage the gear on the shaft and the internal gear and drive the latter, shafts mounted in the ears on the cylinder and projecting over said internal gear, means extending from said shafts into position to be actuated by the extension on the internal gear, and fingers extending from said shafts into engagement with the outer ends of the exhaust valve stems for forcing the latter outwardly as the internal gear revolves.

15. An internal combustion engine including a cylinder formed of two semi-circular separated halves bolted together, two division blocks oppositely located at the joint between said two halves so as to form two chambers in each half which do not extend to the joint between the halves, an oscillatory piston mounted concentrically in said cylinder and having a central portion in engagement with said division blocks and with extensions projecting into each of said chambers, and means for supplying explosive mixture to said chambers for actuating and oscillating said piston.

16. An internal combustion engine provided with a pair of oppositely disposed fan-shaped combustion chambers, an oscillatory piston with its axis between said combustion chambers and with extensions projecting into and operating in said chambers and having a hub, means for supplying an explosive mixture to the combustion chambers for causing the oscillation of the piston, a rocker arm secured to the hub of the piston, a crank shaft coaxial with said piston, a connecting rod from the crank of the crank shaft, a crosshead pivoted to the outer end of said connecting rod, a fixed guideway for said cross head the center line of which would extend between said shaft and the outer end of the rocker arm, and a connecting rod between the outer end of the rocker arm and said crosshead whereby the rocker arm will operate the crosshead and cause rotation of the shaft and said crank will never center.

In witness whereof, I have hereunto affixed my signature in the presence of the witnesses herein named.

RAY CARMICHAEL.

Witnesses:
G. H. BOINK,
O. M. McLAUGHLIN.